US006930137B2

(12) United States Patent
McLeod et al.

(10) Patent No.: US 6,930,137 B2
(45) Date of Patent: Aug. 16, 2005

(54) METHOD OF IMPROVING BLOWN FILM PROCESSING PERFORMANCE AND PHYSICAL PROPERTIES

(75) Inventors: Michael McLeod, Seabrook, TX (US); Nguong van Nguyen, Pasadena, TX (US); Gerhard Guenther, Seabrook, TX (US); Tim J. Coffy, Houston, TX (US); Rodolfo Mier Martinez, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 96 days.

(21) Appl. No.: 10/447,986

(22) Filed: May 29, 2003

(65) Prior Publication Data

US 2003/0236328 A1 Dec. 25, 2003

Related U.S. Application Data

(60) Provisional application No. 60/385,007, filed on May 31, 2002.

(51) Int. Cl.⁷ ............................ C08K 5/526; C08K 5/13
(52) U.S. Cl. ...................... 524/128; 524/139; 524/147; 524/148; 524/149; 524/150; 524/151; 524/152; 524/153; 524/349; 524/350; 524/351; 524/352; 524/353; 252/400.24; 252/404

(58) Field of Search .................. 252/400.24, 404; 524/128, 139, 147–153, 349–353

(56) References Cited

U.S. PATENT DOCUMENTS

| | | | |
|---|---|---|---|
| 3,349,058 A | * | 10/1967 | Harban et al. ............... 524/147 |
| 5,530,072 A | | 6/1996 | Shirodkar ................. 525/333.8 |
| 5,962,598 A | | 10/1999 | Mack et al. .............. 525/333.8 |
| 6,271,377 B1 | * | 8/2001 | Galbo et al. .................. 546/14 |
| 6,433,103 B1 | | 8/2002 | Guenther et al. ......... 525/333.8 |
| 6,545,072 B2 | * | 4/2003 | Tamura et al. .............. 524/108 |

* cited by examiner

Primary Examiner—Peter Szekely
(74) Attorney, Agent, or Firm—Tenley R. Krueger

(57) ABSTRACT

An improved method of manufacturing blown polyolefin films with increased bubble stability and higher blown film production rates is disclosed. A method in which the amounts and ratios of known antioxidant polymer film additives (phosphites and phenolics) are controlled to provide limited long chain branching (LCB) and greater rheological breadth in a polyethylene melt to improve both processing characteristics and mechanical properties in the resulting film.

16 Claims, 5 Drawing Sheets

METHOD OF IMPROVING BLOWN FILM PROCESSING PERFORMANCE AND PHYSICAL PROPERTIES

CROSS-REFERENCE TO RELATED APPLICATIONS

This application claims the benefit under 35 U.S.C. § 119(e) of U.S. Provisional Patent Application No. 60/385,007, filed May 31, 2002, which is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to biaxially-oriented, blown polyolefin films and methods for their manufacture. More particularly, the present invention relates to adjusting the amount and types of antioxidants used in producing blown polyethylene films to achieve a limited amount of long chain branching and increased rheological breadth.

BACKGROUND OF THE INVENTION

Biaxially-oriented, blown polyolefin films are generally known in the art and have been used in the production of articles such as garbage bags, shopping bags, food wraps, and any number of articles requiring polymer chain orientation in both the machine direction (MD) and the transverse direction (TD) of the film. Although cast films may be processed to achieve biaxial-orientation, blown films are generally preferred as they usually required less subsequent processing steps to achieve good mechanical properties, namely tensile strength, elastic modulus, and impact resistance, in both the machine and transverse directions.

It is also common practice within the manufacture of blown film resins to incorporate various stabilizers during the compounding and pelletization step of production. These stabilizers are usually antioxident compounds, namely phosphites or phenolics. Phosphites are generally used to prevent thermal degradation and other chemical interactions that may take place within the melt to negatively impact processing performance and mechanical properties of the resulting polymer film. Phenolics serve to protect the blown polymer film from the effects of aging or long term degradation that may occur over the lifetime of a film at ambient temperature conditions. Whether the polymer is degraded during processing or by aging, this will usually result in a loss of mechanical properties and significantly reduce the ultimate tensile strength and elongation at break percentage for the film. Accordingly, it is now common practice to add phosphite compounds to provide short term antioxident protection during manufacturing and phenolic compounds to provide long term antioxident protection against aging. Antioxident compounds are usually added in relatively small amounts and account for less than about 2% by weight of the resulting blown polymer film.

Polymer degradation in processing may occur in two forms, chain scission and cross-linking (also referred to as long chain branching when the cross-linking is moderate). In the extreme, such as polymer blends without antioxidants, both forms of degradation can be very detrimental to both the processablity of the melt and the physical properties of the blown film. Antioxidants, especially phosphites, protect the polymer and prevent degradation from occurring. However, it is notable that a polyethylene melt which has little long chain branching and narrow rheological breadth may tend to form an unstable film bubble which can be described as bubble breathing (vertical movement of the neck as a function of time), dancing (circular rotation of the bubble around the axis formed by the die center) or movement of the bubble relative to the die which is random in nature. These instabilities cause poor gauge distribution (i.e., variations in film thickness) and may also result in process interruptions that will generally lead to a reduction of the quantity of acceptable film that is produced. Accordingly, there is a need for an improved method of manufacturing blown polyethylene films which regulates the amount and ratios of antioxident additives used to improve film bubble stability and maximize blown film production rates. In addition, the optimization of the antioxident additive package in the resins can improve film mechanical properties. This is achieved with a controlled level of LCB which results in a better balance of machine and transverse direction orientation when processed on commercial blown film equipment at high throughputs.

SUMMARY OF THE INVENTION

The present invention provides an improved method of manufacturing blown polyolefin films with increased bubble stability and higher blown film production rates. More specifically, the present invention provides a method in which the amounts and ratios of known antioxidant polymer film additives are controlled to provide limited long chain branching and greater rheological breadth in a polyethylene melt to improve both processing characteristics and mechanical properties in the resulting film.

BRIEF DESCRIPTION OF THE DRAWINGS

The present invention will be better understood in view of the detailed description in conjunction with the following drawings in which like reference numbers refer to like parts in each of the figures, and in which.

DETAILED DESCRIPTION OF THE INVENTION

Figure 1:
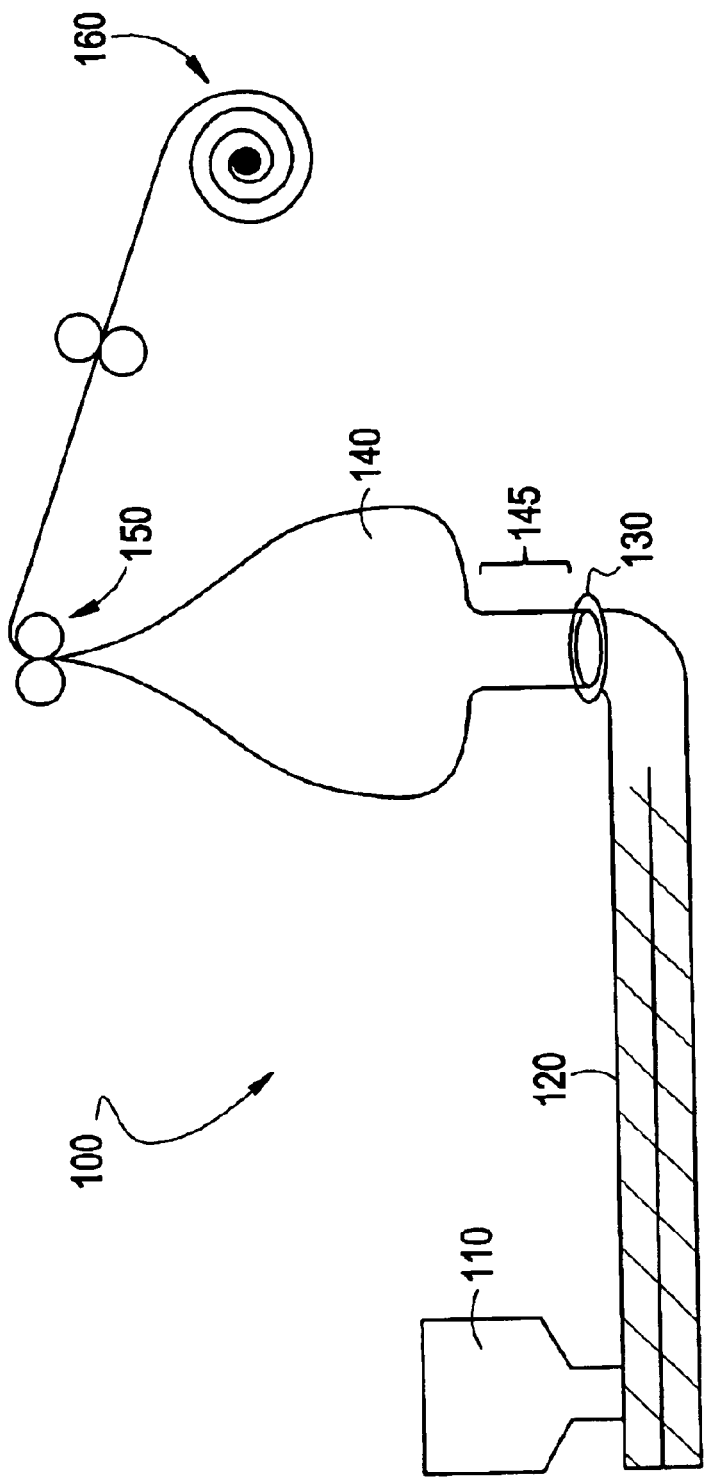
FIG. 1 is an elevational view of a simplified schematic illustrating a blown film production process as known in the art.

FIG. 1 is a simplified schematic of a conventional blown film production line 100 which illustrates the context of the present invention. A blown film production line 100 generally comprises a feeder or hopper 110 which supplies polymer fluff or pellets to an extruder 120 which through a combination of heating and sheer forces delivers a molten polymer mixture to an annular die 130. The annular die 130 forces the molten polymer mixture between a coaxially disposed outer ring and an inner mandrel which have a small gap, typically about 1 to 3 millimeters between the outer ring and the mandrel. Additionally, the annular die comprises two independent air streams, the first of which flows upwardly from the center of the mandrel and the second of which flows generally upward and slightly inward from just beyond the exterior of the outer ring using an air ring, not shown.

As the molten polymer is pushed and pulled upward, the inner air flow is used to provide sufficient air volume to inflate the blown film into a bubble 140. In some cases in order to maximize throughput, internal bubble cooling (IBC) is employed by circulating chilled air inside the bubble to provide additional cooling. The outer air flow serves to cool the molten polymer and to provide an air curtain which helps to maintain a stable bubble 140 of the desired shape and diameter. In some cases an internal bubble stabilizer (IBS) is used to help control the bubble shape. An IBS can be generally be described as a tube located at the center of the die extending upwards with an inverted cone shape on its end. Since bubble expansion occurs shortly after making contact with the IBS cone, the height of the IBS cone relegates the neck height 145. Typically, the inner air pressure will generally be very slightly higher than atmospheric air pressure and, in this way, it is possible to maintain a stable film bubble 140 which does not tend to collapse in on itself. The film bubble 140 travels upwardly a distance of about 20 to 40 feet and is pinched closed at its upper most end by a pair of nip rollers 150 and is then pulled onto a take up roll 160. It is possible to have additional processing steps, not shown, between the nip rollers 150 and the take up roll 160 including heat welding, perforation, corona treatment or the like. It is also possible to cut or slit the nipped, blown film bubble along one side and open this film out into a biaxially-oriented sheet prior to winding on the take up roll.

By controlling the take up rate, blow up ratio (using internal air pressure), throughput, and neck height 145 (using outer air volume, temperature or velocity and IBS cone height), it is possible to adjust the amount of orientation imparted to the polymer film. Generally, films which are drawn or taken up at higher rates of speed will exhibit more orientation in the machine direction and, consequently, have higher tensile strength and elastic modulus in the axial or machine direction of the bubble and higher tear ratios (TD/MD tear ratio=transverse direction tear strength divided by the machine direction tear strength). By slightly increasing the internal pressure, it is possible to allow the polymer film bubble to expand to a greater diameter and impart higher hoop stresses or greater orientation in the transverse direction or about the circumference of the polymer film bubble. However, the amount of orientation which may be imparted to a particular polymer film is strongly correlated to the rheological properties of the polymer melt.

One particularly critical polymer film property which is correlated to the Theological characteristics of the polymer melt is film bubble stability. Studies on pilot plant polymers have shown that increasing the Theological breadth produces more stable blown films bubbles. As noted earlier, bubble stability is a critical property in the production of blown films as film bubbles that tend to breath, dance or shake will generally require the processor to slow the production line to address this issue or a loss of acceptable film product due to poor gauge distribution and properties will result. While operating the blown film line at slower speeds may correct film bubble stability issues, the slower speeds are detrimental to polymer film producers in that the speed of the line is one of the limiting factors in regard to profitability. Blown film producers would like to operate at the highest possible speeds to produce the maximum amount of acceptable film in the shortest amount of time, thus driving down costs and increasing profit per square foot of the film.

Table 1 shows a series of high density polyethylene (HDPE) compositions suitable for the production of blown films. As shown here, various rheological test data has been accumulated on these samples in which the resin is the same and the additive formulation has been varied both in regard to the total amount of stabilizer compounds and the ratios of each of these compounds relative to each other. The additive formulation numbers provided are shown in parts-per-million (ppm) for the entire blend and include varying amounts of calcium sterate (CaST), IRGAFOS 168 (168) a hydrolytically stable phosphite based antioxident available from Ciba Specialty Chemicals of Tarrytown, N.Y., and IRGANOX 1010 (1010) a sterically hindered phenolic antioxident also available from Ciba. It is also understood that other commercially available phosphite and phenolic antioxidants may be used to produce blown HDPE films in accordance with the present invention and that the particular additives referenced here are by way of example only. The calcium sterate has been added to neutralize any remaining catalyst and balance the acidity which may be left as a residue in the HDPE material. As noted earlier, the phosphite additive IRGAFOS 168 is used to provide melt stability during polymer extrusion, and the sterically hindered phenolic compound IRGANOX 1010 is used to provide long term antioxidant protection against the effects of aging.

TABLE 1

| Material Compounding Method | Additive Formulation in ppm (CaST/168/1010) | Melt Index (dg/min) | Zero Shear Viscosity (Pa · sec) | Relaxation Time (sec) | Rheological Breadth Parameter "a" | Activation Energy to Flow (kJ/mol) |
| --- | --- | --- | --- | --- | --- | --- |
| Sample #1 Leistritz | 2800/900/375 | 0.18 | 9.87E+05 | 0.734 | 0.210 | 32.23 |
| Sample #2 Leistritz | 700/900/750 | 0.18 | 1.43E+06 | 0.933 | 0.199 | 33.36 |
| Sample #3 Leistritz | 700/1500/375 | 0.19 | 1.09E+06 | 0.756 | 0.208 | 32.23 |
| Sample #4 Leistritz | 1750/900/563 | 0.17 | 1.49E+06 | 0.944 | 0.198 | 34.66 |
| Sample #5 Leistritz | 1750/1200/375 | 0.16 | 1.34E+06 | 0.865 | 0.201 | 33.71 |
| Farrel | 2800/1500/750 | 0.25 | 5.77E+05 | 0.518 | 0.227 | 31.61 |

Referring to Table 1, the most significant column shown here is rheological breadth, sometimes denoted in the literature by the variable "a". Rheological breadth refers to the breadth of the transition region between Newtonian and power-law type shear rate or frequency dependence of the viscosity. The Theological breadth is a function of the relaxation time distribution of the resin which, in turn, is a function of the resin molecular structure or architecture. Assuming Cox-Merz rule, Theological breadth may be calculated by fitting flow curves generated in linear-viscoelastic dynamic oscillatory frequency sweep experiments with a modified Carreau-Yasuda (CY) model, represented as follows:

$$\eta = \eta_o [1 + (\lambda \dot{\gamma})^a]^{\frac{n-1}{a}}$$

where $\eta$=viscosity (Pa s)

$\gamma$=shear rate (1/s)

a=Theological breadth [describes the breadth of the transition region between Newtonian and power law behavior]

$\lambda$=relaxation time sec [describes the location in time of the transition region]

$\eta_0$=zero shear viscosity (Pa s) [defines the Newtonian plateau]

n=power law constant [defines the final slope of the high shear rate region]

To facilitate model fitting, the power law constant (n) is held at a constant value, e.g., n=0 for all samples presented in Table 1.

For resins with no differences in levels of long chain branching (LCB), it has been observed that the rheological breadth parameter "a" is inversely proportional to the breadth of the molecular weight distribution (MWD). Similarly, for samples that have no differences in the molecular weight distribution, the breadth parameter "a" has been found to be inversely proportional to the level of long chain branching. An increase in the theological breadth of a resin is therefore seen as a decrease in the breadth parameter "a" value for that resin. This correlation is a consequence of the changes in the relaxation time distribution accompanying those changes in molecular architecture. As shown here, there is a general correlation between decreasing the amount of antioxidant in the additive formulation and an increase in rheological breadth.

An increase in the rheological breadth of a polymer is therefore seen as a decrease in the rheological breadth parameter "a" for that polymer. It is believed that by decreasing the amount of secondary antioxidant (phosphite) from levels which are commonly used in the production of blown films, it is possible to induce a slightly higher frequency of long chain branching and produce greater rheological breadth. Pilot plant testing, has confirmed that HDPE polymer blends having greater rheological breadth tend to form more stable film bubbles and can be run at significant higher production rates. It may also be shown that by lessening the amount or varying the ratio of antioxident additives to increase rheological breadth may also be used to tailor the resulting mechanical properties of the finished biaxially-oriented film.

Figure 2:
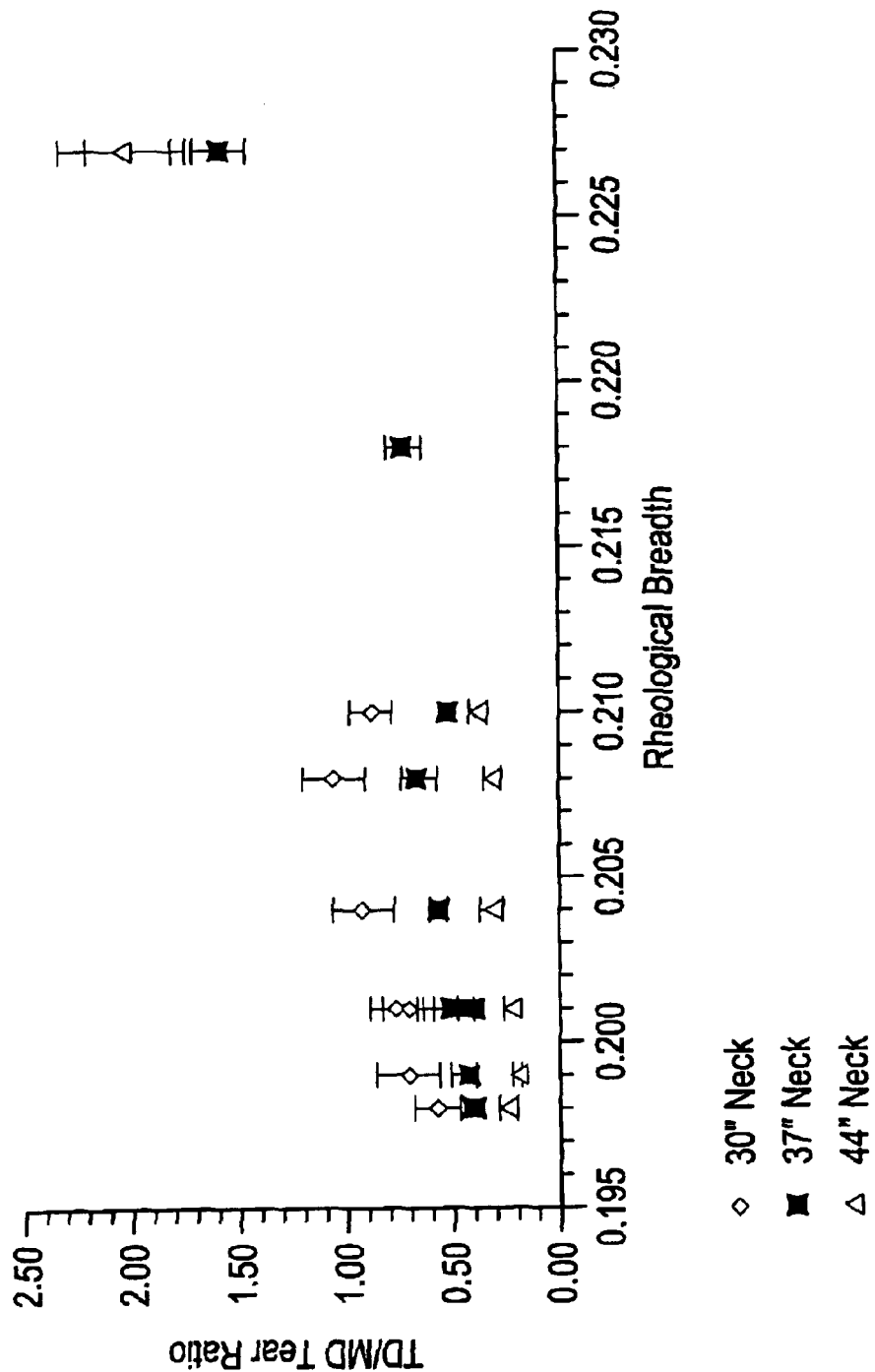
FIG. 2 is a graph showing TD/MD Tear Ratio versus Rheological Breadth for blown polyethylene films.

FIG. 2 shows a graph plotting the transverse direction over machine direction (TD/MD) tear ratio versus the Theological breadth of the polymer blend. It should be noted that these data were collected under processing conditions with significantly less orientation than the film would normally experience under typical commercial processing conditions. However, it is. notable here that by increasing rheological breadth, i.e. decreasing the value of "a", it is possible to reduce the TD/MD tear ratio.

A reduced TD/MD tear ratio is generally indicative of a blown film that has become less oriented in the machine direction. This is significant in that commercial grade blown HDPE films are typically stretched at a ratio in excess of about 10 to 1 in the machine direction and are typically stretched to about 5 to 1, or less, in the transverse or hoop direction. Accordingly, it is a natural consequence that commercial HDPE blown films will have a far greater polymer chain orientation in the machine direction than the transverse direction. Thus, commercial HDPE blown films will usually exhibit very high TD/MD tear ratios because it is far easier to propagate a crack or a tear in the machine direction, generally between polymer chains, than it is to propagate a tear in the transverse direction, generally across polymer chains.

Figure 3:
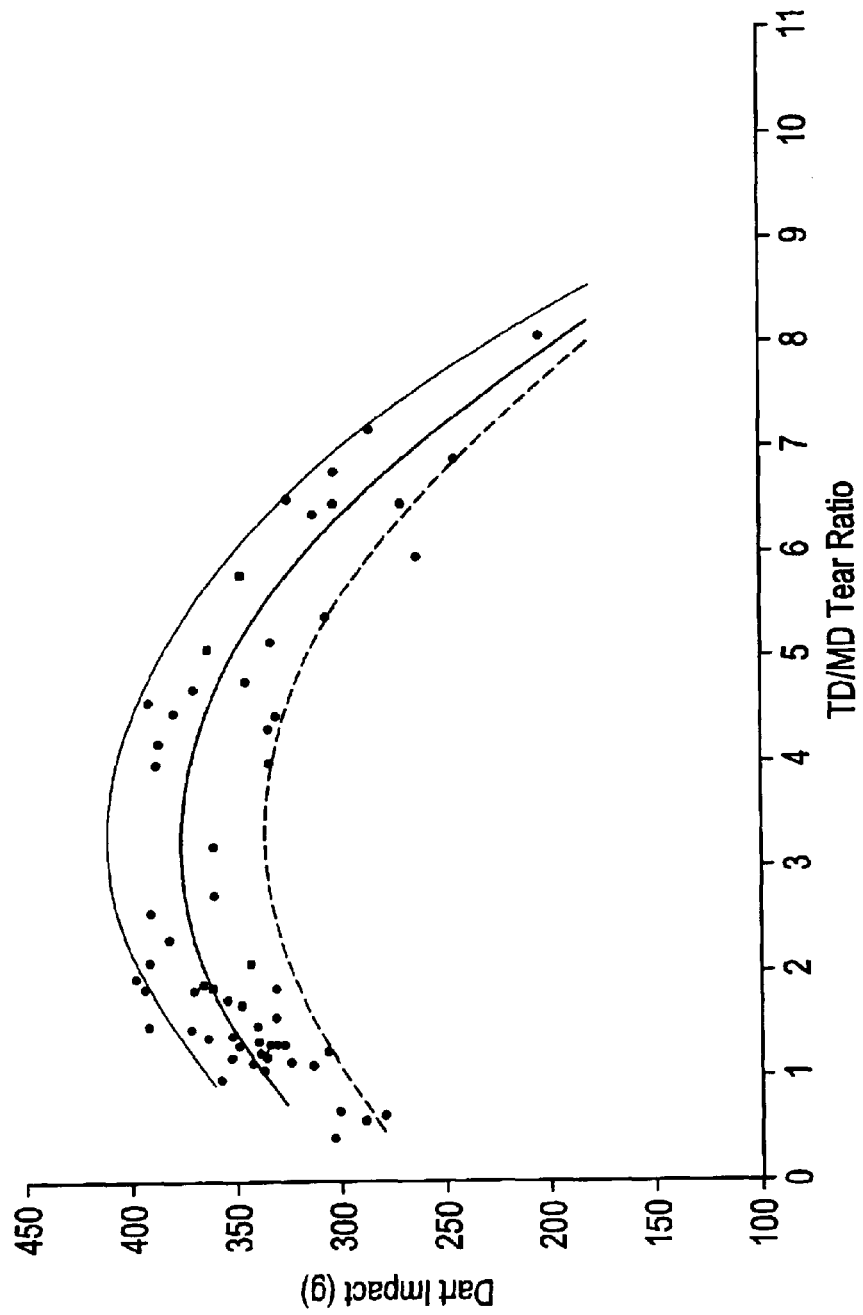
FIG. 3 is a graph showing Dart Impact strength values versus TD/MD Tear Ratio for blown polyethylene films.

FIG. 3 shows dart impact strength values versus TD/MD tear ratios for blown HDPE films. It is notable that the dart impact values peak at a TD/MD tear ratio value or about 3 to 4. However, in regard to the present invention, it is most important to consider the portion of the curve which has TD/MD ratios above this range. This is because typical commercial-grade blown HDPE films exhibit TD/MD ratios of at least about 5 and commonly range from about 10 to 40. Consequently, a change in blend formulation that increases rheological breadth should also reduce the TD/MD tear ratio and, in turn, increase the dart impact strength of the blown film. As discussed previously, this is reasonable because the polymer chains in the film are less oriented in the machine direction and a tear will be more difficult to propagate. On impact, a film that is oriented more evenly in both MD and TD will usually exhibit a greater amount of elongation before failure. Thus, mechanically superior blown films may be produced by slightly reducing antioxidant amounts to permit limited long chain branching and increased Theological breadth.

Figure 4:
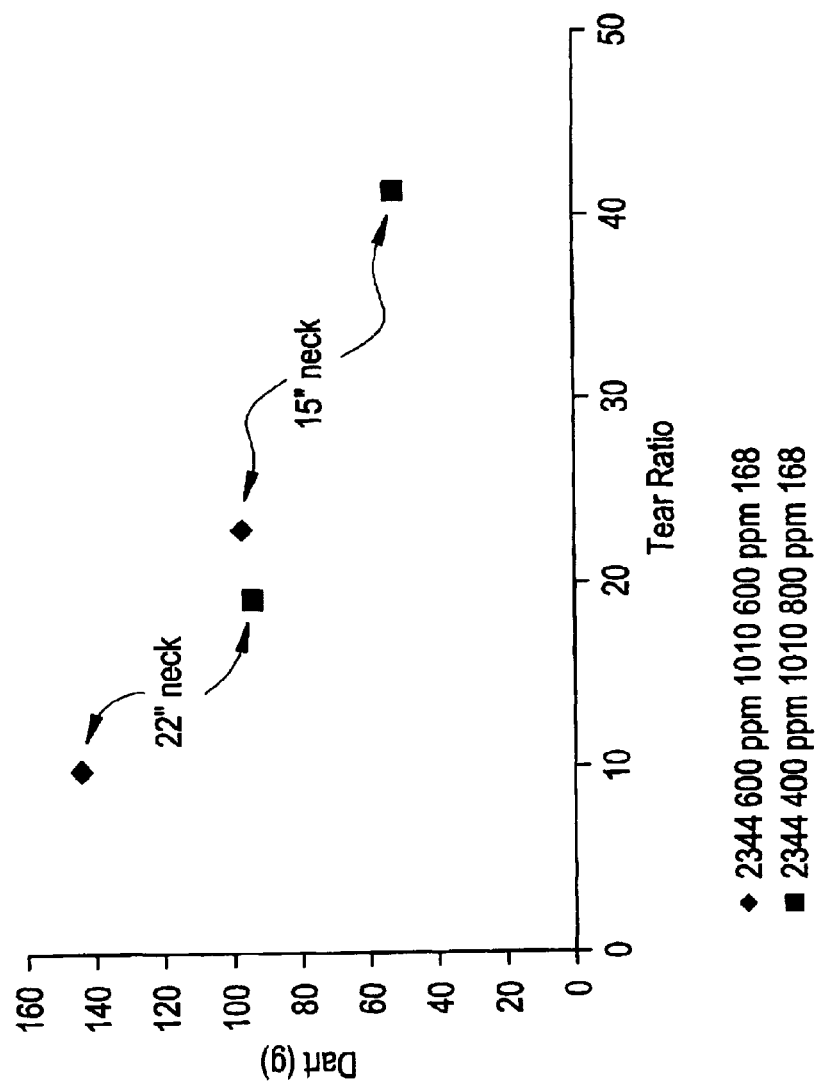
FIG. 4 is a graph showing Dart Impact strength versus TD/MD Tear Ratio for two blown polyethylene film samples in which the ratio of phosphite to phenolic additive has been reduced while keeping the total amount of antioxident additive in both film samples constant.

FIG. 4 illustrates two HDPE polymer samples produced under simulated commercial processing conditions with varying ratios of antioxident additive that is held at a constant amount of 1,200 ppm for the film. As shown here, under simulated commercial conditions, the TD/MD tear ratios may be significantly higher and in a range of about 10 to about 40. Note that for these samples it is clear that by lessening the amount of phosphite additive (IRGAFOS 168) from a 2:1 ratio to a 1:1 ratio it is possible to both lessen the orientation of the film in the machine direction thus lowering the tear ratio while also significantly increasing the dart impact strength of the resulting films. It is believed this is possible in films of this type because by making the film less oriented, particularly in the machine direction, it is possible to produce a blown film in which the dart has difficulty tearing through the film than one in which the tear ratio showed a greater disparity between the TD and MD orientation. In short, the less oriented polymer film exhibits a higher dart impact strength because the less oriented film does not propagate a tear in the machine direction as readily as the films exhibiting higher tear ratios, and the film will tend to deform in both the TD and MD to a higher degree before failing in a catastrophic manner. Increased impact strengths and a lower degree of machine direction film orientation are usually highly desirable characteristics in commercial grade blown HDPE films.

Figure 5:
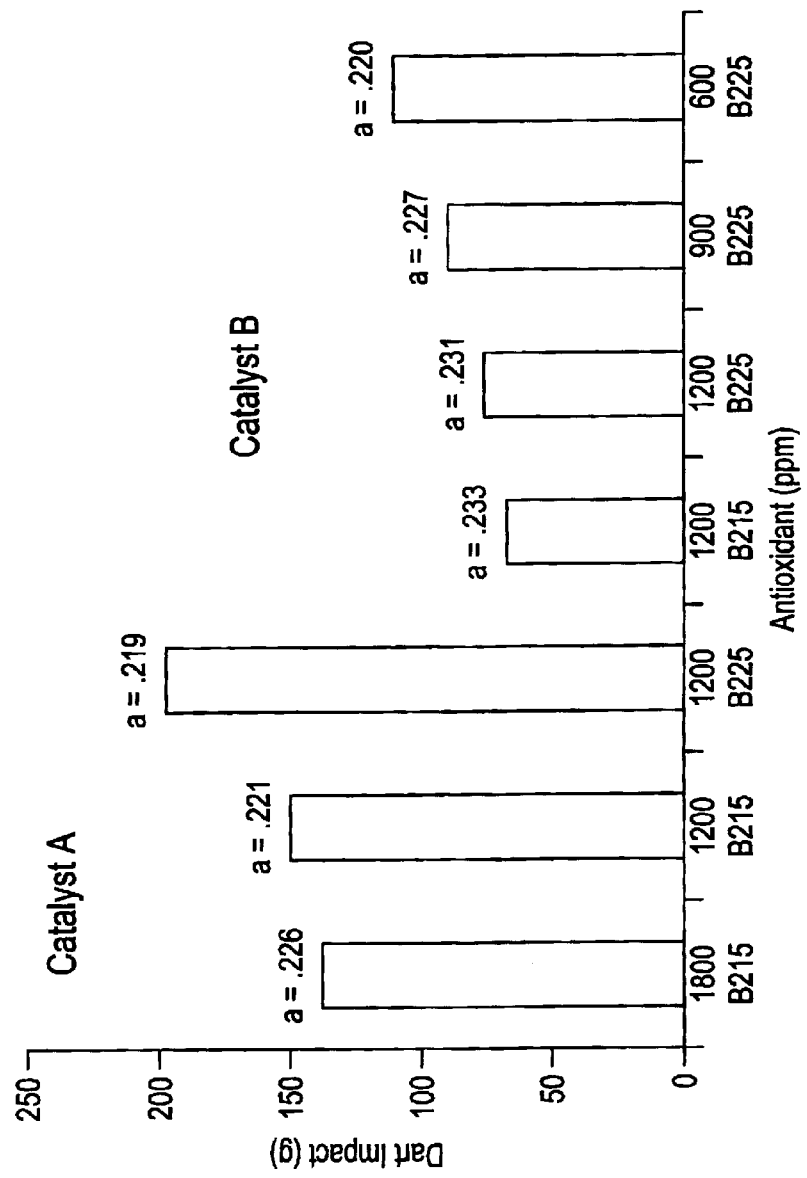
FIG. 5 is a graph showing Dart Impact strength versus TD/MD Tear Ratio for a series of blown polyethylene film samples in which the ratio of phosphite to phenolic additive has been reduced while also varying the total amount of antioxidant additive in the samples.

FIG. 5 presents dart impact data for a series of HDPE blown polymer film samples produced under simulated commercial processing conditions at two ratios of phosphite to phenol additives while varying the total amount of antioxidants from about 1800 ppm to 600 ppm. Note that the HDPE blends presented here were produced with different catalyst systems (A and B) having inherently different dart impact values. However, the trends identified and discussed earlier are at work here. Clearly, samples with lower "a" values (greater Theological breadth) consistently exhibit higher dart impact values. The lower "a" values are achieved by reducing the total amount of antioxidant additives from 1800 ppm to 1200 ppm for the A-type samples and from 1200 ppm to 600 ppm for the B-type samples. Also, it is again shown that by changing the ratio of phosphite to phenolic antioxidants from 2:1 (indicated as B215) to 1:1 (indicated as B225) the "a" value is reduced for equivalent amounts of additive.

It is notable that many commercial grade blown HDPE films may have antioxidant concentrations of about 2400 ppm or more, but that in accordance with the present invention film bubble stability and impact strength characteristics may both be improved by using lower concentrations, particularly in regard to phosphites. These films will always require antioxidant additives to inhibit polymer degradation but, as shown herein, total antioxidant concentrations may yield better films at about 400 ppm to about 1800 ppm and preferably from about 600 ppm to about 1200 ppm. Additionally, it would appear that the best mechanical characteristics result from phosphite to phenolic additive ratios of about 0.5:1 to about 1.5:1 and preferably about 1:1. This generally yields phosphite concentrations of about 200 ppm to about 800 ppm and preferably from about 300 ppm to about 600 ppm.

While a preferred embodiment of the invention has been shown and described herein, modifications thereof may be made by one skilled in the art without departing from the spirit and the teachings of the invention. The embodiments described herein are exemplary only, and are not intended to be limiting. Many variation, combinations and modifications of the invention disclosed herein are possible and are within the scope of the invention. Accordingly, the scope of protection is not limited by the description set out above, but is defined by the claims which follow, that scope including all equivalents of the subject matter of the claims.

What is claimed is:

1. A blown polyethylene film comprising from about 400 ppm to about 1800 ppm of a blend of antioxidants, wherein the blend consists of a phosphite antioxidant and a phenolic antioxidant.

2. The film of claim 1 wherein a ratio of the phosphite antioxidant to the phenolic antioxidant ranges from about 0.5:1 to about 1.5:1.

3. The film of claim 1 wherein a ratio of the phosphite antioxidant to the phenolic antioxidant is about 1:1.

4. The film of claim 1 wherein a concentration of the phosphite antioxidant in the article of manufacture ranges from about 200 ppm to about 800 ppm.

5. The film of claim 1 wherein a concentration of the phosphite antioxidant in the article of manufacture ranges from about 300 ppm to about 600 ppm.

6. The film of claim 1 having an "a" parameter of less than 0.24.

7. The film of claim 1 having a TD/MD tear ratio of less than 10.

8. The film of claim 1 having a dart impact strength greater than 130 g.

9. A method of making a blown polyolefin film comprising adding a blend of antioxidants consisting of a phosphite antioxidant and a phenolic antioxidant in an amount such that the total concentration of the antioxidants in said blown polyolefin film ranges from about 400 ppm to about 1800 ppm.

10. The method of claim 9 wherein a ratio of the phosphite antioxidant to the phenolic antioxidant ranges from about 0.5:1 to about 1.5:1.

11. The method of claim 9 wherein a ratio of the phosphite antioxidant to the phenolic antioxidant is about 1:1.

12. The method of claim 9 wherein a concentration of the phosphite antioxidant in the article of manufacture ranges from about 200 ppm to about 800 ppm.

13. The method of claim 9 wherein a concentration of the phosphite antioxidant in the article of manufacture ranges from about 300 ppm to about 600 ppm.

14. The method of claim 9 wherein the polyolefin film has an "a" parameter of less then 0.24.

15. The method of claim 9 wherein the polyolefin film has a TD/MD tear ratio of less than 10 .

16. The method of claim 9 wherein the polyolefin film has a dart impact strength greater than 130 g.

* * * * *